United States Patent
Flavell (12) 
(10) Patent No.: US 6,446,432 B1
(45) Date of Patent: Sep. 10, 2002

(54) HYDRAULIC LOGIC CROSS-COUPLING BETWEEN PHYSICALLY-SEPARATE REDUNDANT SERVOACTUATORS

(75) Inventor: David J. Flavell, Tierra Verde, FL (US)

(73) Assignee: Moog Inc., East Aurora, NY (US)

( * ) Notice: Subject to any disclaimer, the term of this patent is extended or adjusted under 35 U.S.C. 154(b) by 98 days.

(21) Appl. No.: 09/735,959

(22) Filed: Dec. 13, 2000

Related U.S. Application Data (63) Continuation-in-part of application No. 09/244,708, filed on Feb. 4, 1999, now abandoned.

(51) Int. Cl.$^7$ .......................... F15B 18/00; B64C 13/42
(52) U.S. Cl. ................................. 60/405; 60/406
(58) Field of Search .................. 60/399, 405, 406, 60/403; 91/510

(56) References Cited

U.S. PATENT DOCUMENTS

| | | | | |
|---|---|---|---|---|
| 3,023,782 A | * | 3/1962 | Chavez et al. ............... | 137/85 |
| 4,257,311 A | * | 3/1981 | Barnsley et al. ............. | 91/510 |
| 4,671,166 A | * | 6/1987 | Glaze et al. ................. | 244/233 |

* cited by examiner

Primary Examiner—Edward K. Look
Assistant Examiner—Thomas E. Lazo
(74) Attorney, Agent, or Firm—Phillips, Lytle, Hitchcock, Blaine & Huber LLP (57) ABSTRACT

A redundant control actuation system (100) provides hydraulic logic cross-coupling between physically-separate servoactuators (101A, 101B). Each servoactuator has a control valve (102A, 102B) arranged to provide a hydraulic output in response to a control signal. Each actuator also has a hydraulic actuator (106A, 106B) arranged to move a load in response to the hydraulic output from its associated control valve. Logic valve means (103A, 104A, 105A, 103B, 104B, 105B) are operatively associated with the control valves (102A, 102B) and actuators (106A, 106B). Each logic valve means is supplied with hydraulic and electrical input signals. Each logic valve means is operatively arranged between the associated control valve and actuator to either (a) permit control operation of the actuator in response to the control signal, (b) permit the actuator to move freely and independently of the control signal, or (c) restrain movement of the load independently of the control signal, as a function of the supplied input signals. Each logic valve means is operatively arranged to provide a hydraulic output signal. The hydraulic output signal of each servoactuator is provided as the hydraulic input signal to the other servoactuator.

21 Claims, 8 Drawing Sheets

HYDRAULIC LOGIC CROSS-COUPLING BETWEEN PHYSICALLY-SEPARATE REDUNDANT SERVOACTUATORS

CROSS-REFERENCE TO RELATED APPLICATION

This application is a continuation-in-part of prior pending U.S. patent application Ser. No. 09/244,708, filed Feb. 4, 1999, now abandoned.

TECHNICAL FIELD

The present invention relates generally to servoactuators for moving a load in response to a control signal, and, more particularly, to an improved redundant control actuation system in which physically-separate servoactuators, the outputs of which are connected to a common load, are cross-coupled to exchange hydraulic logic information therebetween.

BACKGROUND ART

Modem fly-by-wire ("FBW") aircraft use hydraulically-powered electrically-controlled actuation systems, typically dual-redundant, to operate flight control surfaces, and, more recently, engine thrust-vectoring controls. As used herein, the term "actuation system" refers to the total number of electrohydraulic components required to move the surface with the required functionality and performance. Many of these systems, particularly those designed for military aircraft, take the form of tandem-piston servoactuators that integrate the elements of a dual-redundant actuation system into a single mechanical package and have redundant sources supplying pressurized hydraulic fluid independently to one or more integrated electrohydraulic servovalves. On the other hand, in commercial aircraft, it is generally desired that such dual-redundant actuator systems employ physically-separated single-system servoactuators that are connected to a common load and are provided with separate connections to independent pressure sources and fluid returns.

In either case, these redundant actuation systems have been typically arranged to operate cooperatively. More particularly, the servovalves have been typically connected with respect to their respective actuators with logic valves that permit three distinct operating modes for each operable half of a dual servoactuator or for each single-system servoactuator. The first of these modes involves active control, in which the servovalve is used to actively control the flows of fluid with respect to the associated actuator. The second mode is known as a free-bypass mode, in which the actuator is effectively disconnected from its associated servovalve (e.g., because its control elements or power supplies have failed) to permit continued control and operation of the load by the other servoactuator. The third is known as a fail-safe mode, in which the servovalve is disconnected from the associated actuator, and in which the opposing chambers of the disconnected actuator communicate with one another through a restricted orifice to permit continued, albeit "damped", movement of the load.

Previous cross-coupling techniques for redundant servoactuators have employed the exchange of electrical and/or hydraulic signals. In general, these prior art devices have involved pilot-operated solenoid valves and fail-safe valves to accomplish mode switching in response to certain conditions. Some devices have even employed a bypass valve in connection with a fail-safe valve. Upon information and belief, each of these prior systems has involved a compromise of performance, weight, size or expense.

Accordingly, it would generally be desirable to provide an improved redundant control actuation system, and servoactuator for use in same, that avoids these compromises in the prior art.

DISCLOSURE OF THE INVENTION

Figure 4:
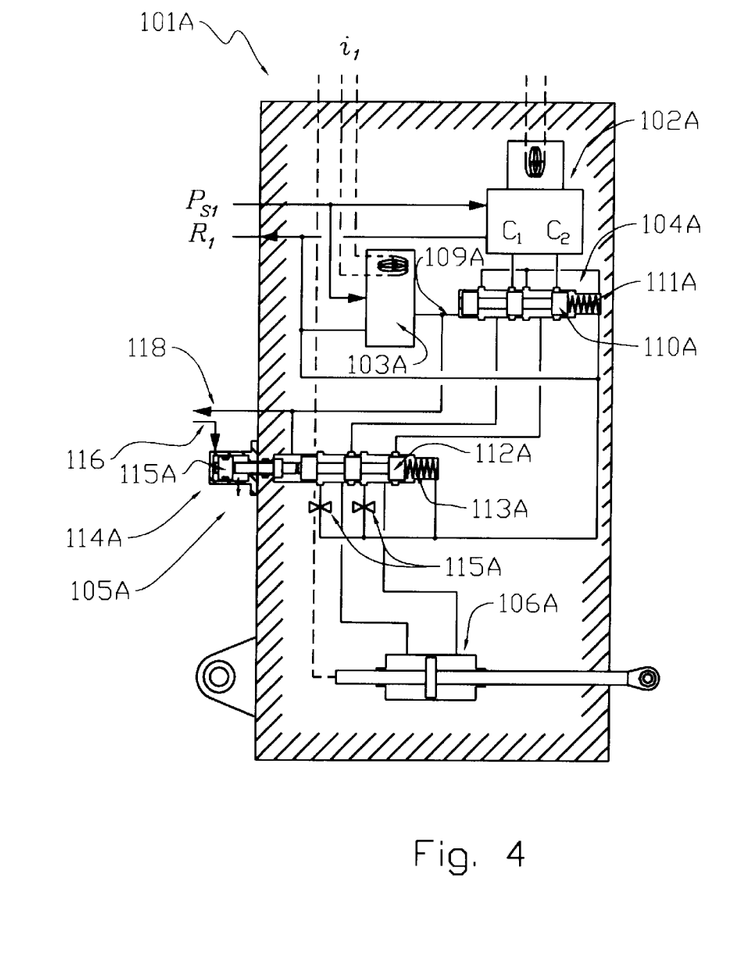
FIG. 4 is a schematic of an improved servoactuator.
Figure 4A:
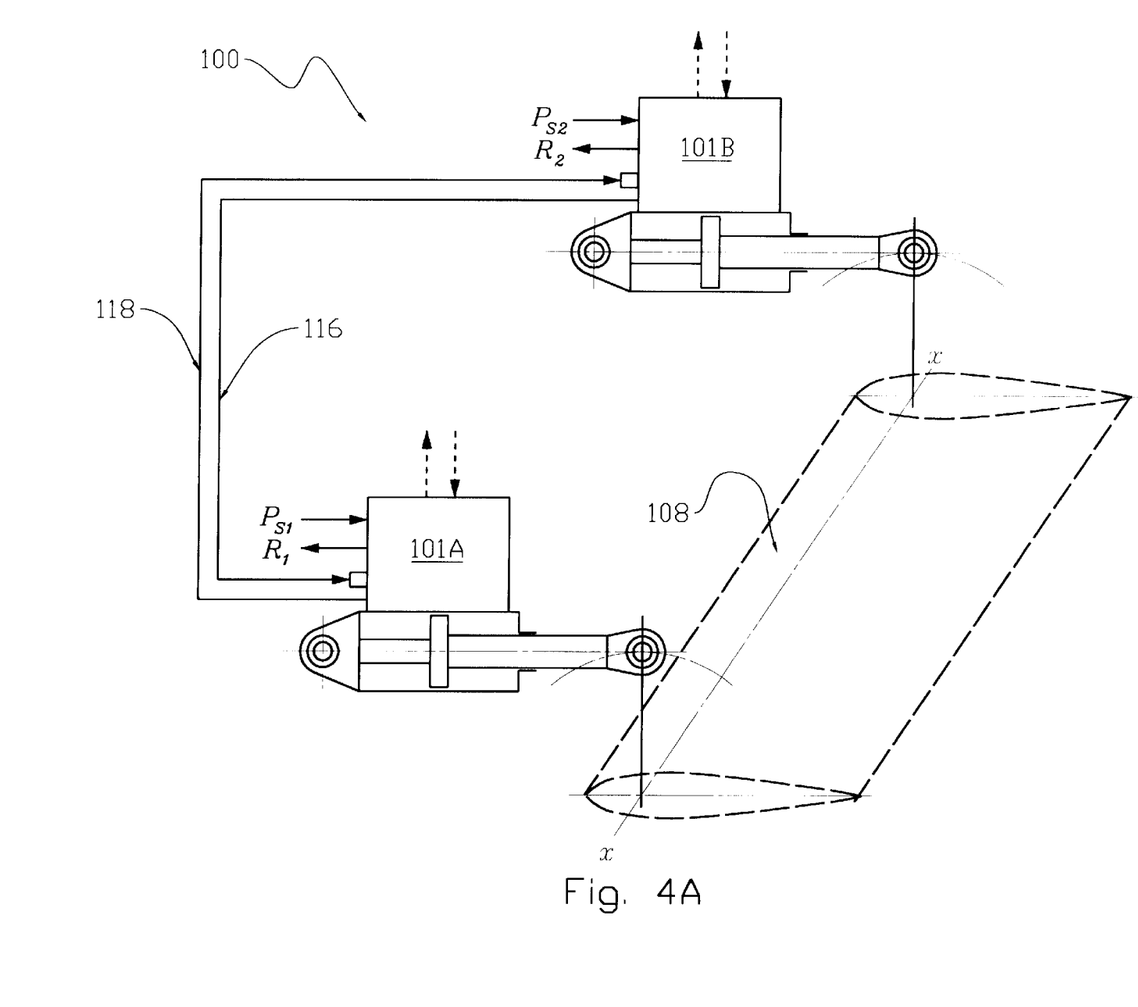
FIG. 4A is a schematic of an improved dual-redundant control actuation system according to the present invention, which provides hydraulic logic cross-coupling between physically-separate single-system servoactuators connected to a common load.

With parenthetical reference to the corresponding parts, portions or surfaces of the embodiment disclosed in FIGS. 4 and 4A, merely for purposes of illustration and not by way of limitation, the present invention broadly provides an improved servoactuator (101A) for use in a redundant control actuation system (100), and an improved redundant control actuation system employing such servoactuators.

The improved servoactuator has a body and broadly includes: a control valve (102A) mounted on the body and arranged to provide a hydraulic output in response to a control signal; a hydraulic actuator (106A) mounted on the body and arranged to move a load in response to the hydraulic output from the control valve; and logic valve means (103A, 104A, 105A) mounted on the body and operatively associated with the control valve and actuator. The body communicates with a source of pressurized fluid ($P_{S1}$) and with a fluid return ($R_1$). The body is also provided with an external hydraulic signal. The logic valve means is supplied with such hydraulic signal and with electrical input signals, and is operatively arranged between the control valve and the actuator to either (a) control operation of the actuator in response to the control signal, (b) permit the actuator to move freely and independently of the control signal, or (c) restrain movement of the load independently of the control signal. The selected mode is a function of the supplied hydraulic and electrical input signals. The logic valve means is operatively arranged to provide a hydraulic output signal external of the body which is a function of the supplied hydraulic and electrical signals.

The improved redundant control actuation system (100) broadly comprises: first and second servoactuators (101A, 101B), each servoactuator having a body and having: a control valve (102A, 102B) mounted on the associated body and arranged to provide a hydraulic output in response to a control signal; a hydraulic actuator (106A, 106B) mounted on the associated body and arranged to move a load in response to the hydraulic output from the associated control valve; and logic valve means (103A, 104A, 105A, 103B, 104B, 105B) mounted on the associated body and operatively associated with the control valve and actuator. The associated body communicates with a source of pressurized fluid ($P_{S1}$, $P_{S2}$) and with a fluid return ($R_1$, $R_2$), and is provided with an external hydraulic signal. The logic valve means of each servoactuator is supplied with such hydraulic and electrical input signals, and is operatively arranged between the associated control valve and actuator to either (a) control operation of the actuator in response to the control signal, (b) permit the actuator to move freely and independently of the control signal, or (c) restrain or impede free movement of the load independently of the control signal. The selected mode is a function of the supplied input signals. The logic valve means of each servoactuator is arranged to provide a hydraulic output signal external of the associated body which is a function of the hydraulic and electrical signals. The hydraulic output signal of one servoactuator is provided as the hydraulic input signal to the other servoactuator.

In the preferred embodiment, each control valve (102A, 102B) is an electrohydraulic servovalve, and the two servovalves are identical.

Each servoactuator (101A, 101B) may further include a first flow passageway arranged to selectively communicate the opposing chambers of its associated actuator when its logic valve means permits the actuator to move freely and independently of the control signal. Each servoactuator may further include a second flow passageway having a restricted orifice (115A, 115B). The second flow passageway is arranged to selectively communicate the opposing chambers of its associated actuator when its logic valve means causes the actuator to restrain movement of the load independently of the control signal.

The logic valve means may include a bypass valve (104A, 104B) and a fail-safe valve (105A, 105B) connected hydraulically in series between the associated control valve (102A) and actuator (106A). The bypass valve is movable between a first position in which fluid is permitted to flow between the associated control valve and actuator, and a second position in which fluid is prevented from flowing therebetween and is freely bypassed (i.e., without purposeful flow restriction) between the opposing chambers of the associated actuator. The bypass valve may be biased toward the second position. The bypass valve may include a valve spool (110A, 110B) mounted for sealed sliding movement within a body, and may further include a spring (111A, 111B) operatively arranged to cause the spool to move toward the second position. The spool may be caused to move toward the first position by a fluid pressure.

The servoactuator may further include a port to which an external source of pressurized fluid ($P_{S1}$) is supplied, and a solenoid valve (103A, 103B) operatively arranged between the port and the bypass valve. The solenoid valve may communicate with the port and be arranged such that energization of the solenoid valve by the electrical input signal will cause pressurized fluid from the port to move the bypass valve spool (110A, 110B) to the first position and to provide the hydraulic output signal.

The fail-safe valve (105A, 105B) is movable between an open position in which fluid is permitted to flow between the associated bypass valve and the actuator, and a closed position in which fluid is prevented from flowing between the associated bypass valve and actuator. The fail-safe valve may be biased toward its closed position. The fail-safe valve may further include a valve spool (112A, 112B) mounted for sealed sliding movement within a body, and a spring (113A, 113B) operatively arranged to cause the fail-safe valve spool to move toward its closed position. A fluid pressure, supplied to the servoactuator as its hydraulic input signal, may urge the fail-safe valve spool to move toward its open position.

Accordingly, the general object of the present invention is to provide an improved servoactuator for use in a redundant control actuation system.

Another object is to provide an improved redundant control actuation system employing two such servoactuators.

Still another object is to provide an improved redundant control actuation system which employs hydraulic logic cross-coupling between physically-separate redundant servoactuators to allow each servoactuator three modes of operation, as appropriate, without electrical cross-coupling between them.

These and other objects and advantages will become apparent from the foregoing and ongoing written specification, the drawings, and the appended claims.

DESCRIPTION OF PREFERRED EMBODIMENT(s)

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up", and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis or elongation, or axis of rotation, as appropriate. In addition, the expression "mounted on a body", and equivalents thereof, shall be understood to encompass mounting on or within a body, and the term "body" shall be understood to also encompass body assemblies comprised of two or more parts.

The present invention broadly provides an improved servoactuator (FIG. 4) for use in a redundant control actuation system (FIG. 4A), and to a redundant control actuation system employing such improved servoactuators. However, before proceeding to a discussion of the present improvements, it is deemed advisable to first review three prior art redundant control actuation systems incorporating servoactuators, in order that the significance of the present invention may be better understood.

Figure 1:
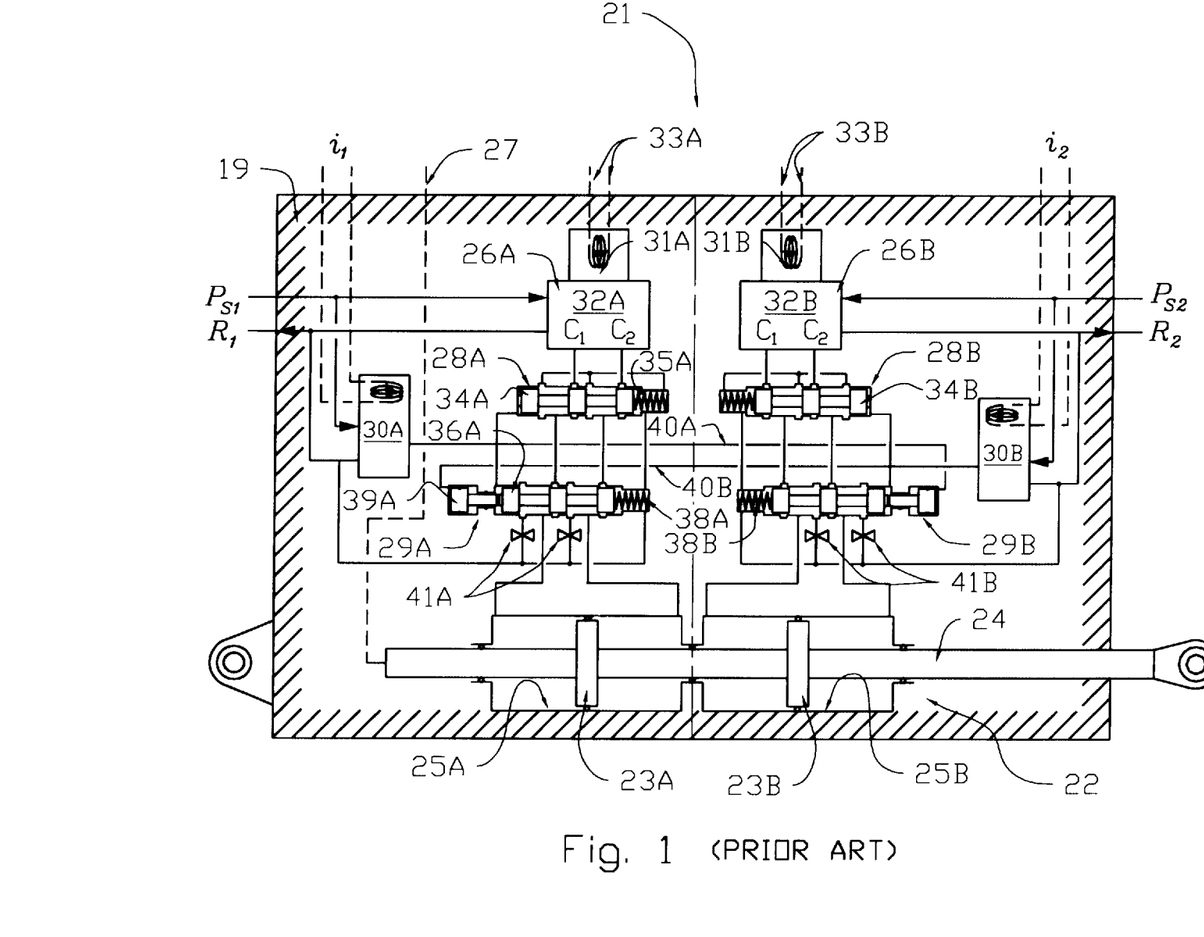
FIG. 1 is a schematic of a first prior art dual-redundant control actuation system in which two control valves and associated logic valve means are mounted on a common body, and are coupled to a common tandem actuator to form an integrated dual-tandem servoactuator.
Figure 1A:
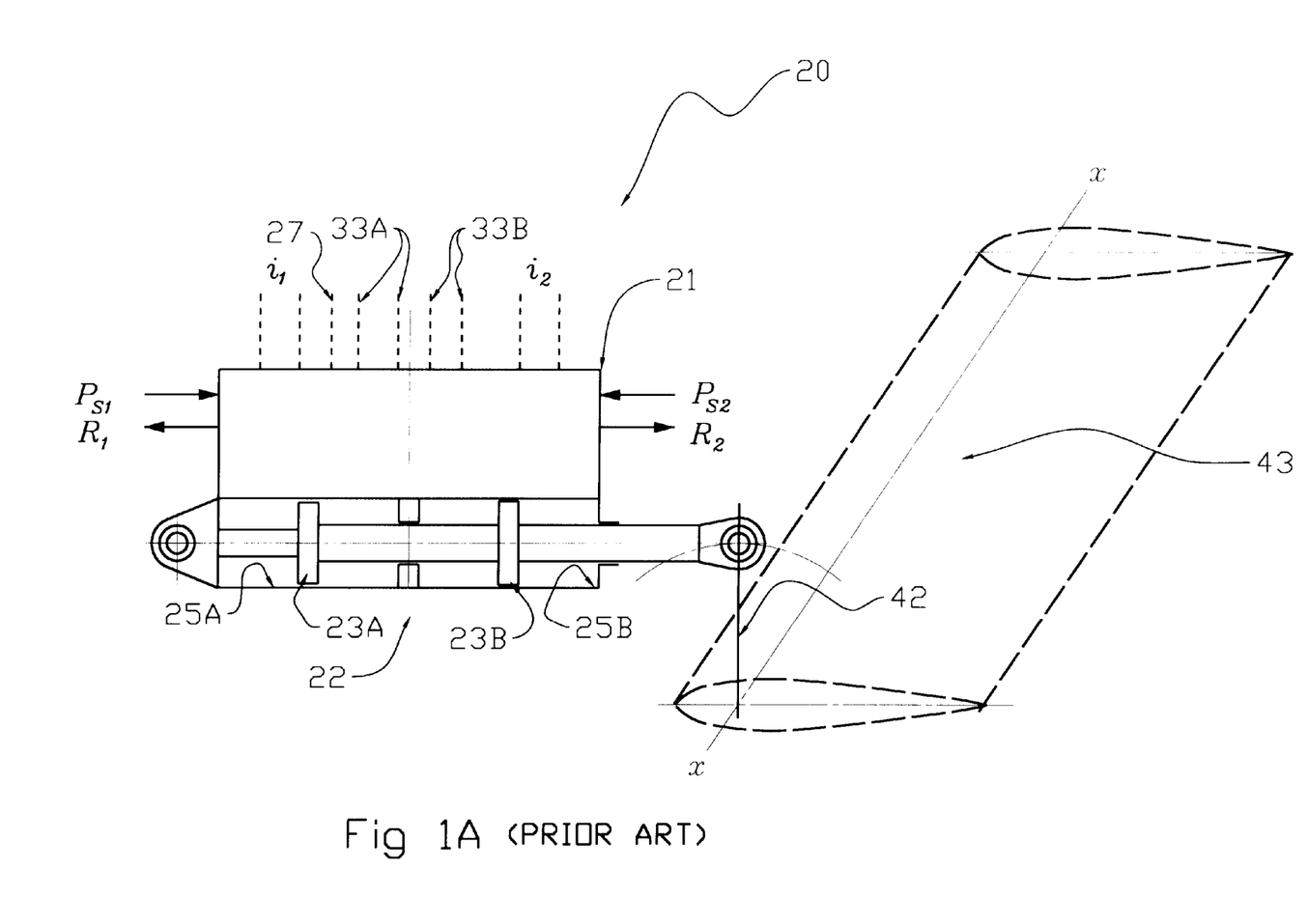
FIG. 1A is a schematic view of the servoactuator shown in FIG. 1 in association with an airfoil surface.

First Prior Art Embodiment (FIGS. 1 and 1A)

Referring now to FIGS. 1 and 1A, a first prior art redundant control actuation system is generally indicated at 20. As best shown in FIG. 1, this control system is comprised of two actuators, two control valves, and two logic valve means, all mounted on a common body 19 to form an integrated dual-tandem servoactuator 21. In this form, the servoactuator 21 comprises the entire control actuation system. The two actuators are combined to form a common tandem piston actuator, generally indicated at 22.

Actuator 22 is shown as having two axially-spaced pistons 23A, 23B mounted on a common rod 24. Left piston 23A is mounted for sealed sliding movement within a left cylinder 25A, and right piston 23B is mounted for sealed sliding movement within a right cylinder 25B. The control valve and logic valve means coupled to the left piston and cylinder 23A, 25A are identical to the control valve and logic valve means coupled to the right piston and cylinder 23B, 25B. Hence, only the left valve and actuator parts of the servoactuator 21 will be explicitly described, it being understood that the corresponding reference numeral, albeit identified with suffix letter "B" rather than "A", refers to the corresponding part, portion or surface of the right valve and actuator component parts of servoactuator 21.

Servoactuator 21 is shown as broadly including two two-stage four-way electrohydraulic servovalves, generally indicated at 26A, 26B; two bypass valves 28A, 28B; two fail-safe valves 29A, 29B; and two pilot solenoid valves 30A, 30B. An electrical feedback signal, reflective of the position of rod 24 relative to the body 19, is supplied from a suitable sensor, such as a linear variable differential transformer ("LVDT") (not shown) or equivalent, via line 27.

Servovalve 26A is arranged to be supplied with pressurized hydraulic fluid $P_{S1}$ from a suitable source (not shown), and is connected to a first fluid return $R_1$. Servovalve 26A may, for example, be of the type disclosed in U.S. Pat. No. 3,023,782, the aggregate disclosure of which is incorporated by reference. Suffice it to say here that this servovalve is known, and includes an electrical section 31A and a hydraulic section 32A. This type of servovalve is used to produce a differential hydraulic output at outlet ports $C_1$, $C_2$ in proportional response to an input electrical signal supplied via conductors 33A to the electrical section of the servovalve.

Bypass valve 28A is shown as having a three-lobed valve spool 34A mounted for sealed sliding movement within a cylinder. The spool is biased to move leftwardly to the position shown by a spring 35A in the right spool right end chamber.

The fail-safe valve 29A is also shown as having a three-lobed valve spool 36A mounted for sealed sliding movement within a body or cylinder. The spool is biased to move leftwardly by a spring 38A in the right spool end chamber. An actuator piston 39A is operatively arranged in a cylinder, and has a stub shaft arranged to bear against the left end of spool 36A.

Solenoid valve 30A is also arranged to be provided with pressurized fluid from source $P_{S1}$, and communicates with return $R_1$. Solenoid valve 30A is a conventional three-way two-position solenoid valve. When the solenoid is de-energized (as shown), conduit 40A communicates with return $R_1$. When the solenoid is supplied with an energization current $i_1$, pressurized fluid from source $P_{S1}$ is supplied to conduit 40A, to the left spool end chamber of the fail-safe valve 29A, and to the right piston end chamber of piston 39B for fail-safe valve 29B. Conversely, another conduit 40B communicates solenoid valve 30B with the right spool end chamber of the fail-safe valve 29B and the left end chamber of actuator piston 39A.

The structure shown in FIG. 1 is in a depressurized and de-energized condition.

When the system is energized and pressurized, supply pressure $P_{S1}$ and $P_{S2}$ are provided to the servoactuator 21, where indicated. Similarly, the servoactuator return ports communicate with separate fluid returns $R_1$, $R_2$. An electrically-commanded hydraulic pressure differential is produced at the outlet ports $C_1$, $C_2$ of each servovalve in response to the electrical signal supplied to the associated servovalve via conductors 33A, 33B.

Solenoid valves 30A, 30B are energized with currents $i_1$, $i_2$ respectively. Hence, supply pressure $P_{S1}$ exists in conduit 40A, and is applied to the left spool end chamber of the fail-safe valve 29A and to the right end chamber of piston 39B. This displaces fail-safe valve spools 36A rightwardly and 36B leftwardly, compressing springs 38A and 38B. Conversely, supply pressure $P_{S2}$ exists in conduit 40B, and is applied to the right spool end chamber of the fail-safe valve 29B and the left end chamber of actuator piston 39A, to displace fail-safe valve spools 36A rightwardly and 36B leftwardly, compressing springs 38A, 38B. When the two fail-safe valve spools are so displaced, the conduits containing the restricted orifices, severally indicated at 41A, 41B, respectively, are covered. Thus, such energization and pressurization overcomes the opposing bias of springs 39A, 39B, and shifts each fail-safe valve spool hard-over to enable unrestricted flow from the associated bypass valve through the associated fail-safe valve to the opposing chambers of the associated actuator.

Supply pressure is also supplied to the left and right spool end chambers of bypass valves 28A, 28B, respectively. This shifts each bypass valve spool hard-over, compressing springs 35A and 35B, respectively. This displacement of each bypass valve spool selectively communicates the servovalve outlet ports $C_1$, $C_2$ with the opposing actuator chambers via the now-displaced bypass and fail-safe valve spools. In this configuration, the dual-redundant servoactuator operates in an active-active manner in which both servovalves are simultaneously operated to control the flows of fluid with respect to their respective actuator chambers.

Suppose now that there is an energization or pressurization failure of the right section of the servoactuator. Either situation will cause conduit 40B to communicate with return $R_2$ instead of supply pressure $P_{S2}$. The right spool end chamber of bypass valve 34B, and the right spool end chamber of fail-safe valve 29B, will both be vented to return $R_2$. Hence, bypass valve 28B will be shifted from its displaced or energized state, back to the position shown in FIG. 1. However, because the left section of the servoactuator is still operational in this example (i.e., is still pressurized and energized), supply pressure $P_{S1}$ will continue to be provided through conduit 40A to the right end chamber of fail-safe valve 29B and will keep the fail-safe valve spool 36B shifted leftwardly. Hence, the opposing chambers of the right actuator will communicate with one another through bypass valve 28B and fail-safe valve 29B, the spool of which is still displaced. In other words, the opposing chambers of the rightward actuator will communicate via a plurality of series-connected passageways such that the right actuator will be bypassed. Hence, it may move freely, the only intended resistance being the pressure to move the fluid through the series of connected passageways. Thus, in the situation where there is a pressurization or energization failure of servovalve B, control of the actuator will still be continued by servovalve A, and actuator B will be in free-bypass mode. Of course, if servovalve A were to be depressurized or de-energized, while servovalve B continued to operate, the situation would be reversed.

Alternatively, if there is a pressurization and/or energization failure of both sections of the servoactuator, solenoid valves 30A and 30B would communicate conduits 40A and 40B with returns $R_1$, and $R_2$, respectively. Hence, the bypass valve springs and the fail-safe valve springs would both expand to urge their respective valve spools to move back to the positions shown in FIG. 1. In this condition, the opposing chambers of both sections of the tandem actuator communicate with their respective fluid returns via passageways containing restricted orifices 41A, 41B, respectively. Hence, in this third fail-safe mode, neither servovalve controls the operation of the load, but, passageways containing restricted orifices communicate the actuator opposing chambers with their respective returns. While not controlling the movement of the load, this load restraint is customarily sized to prevent "flutter" and other forms of dynamic instability of the load.

Thus, in this first prior art system, two servovalves, two sets of control logic valving and two actuators were mounted on a common body to form a dual-redundant control actuation system in the form of a tandem servoactuator assembly. The two actuators and their respective control valving were not physically separate from one another, but, to the contrary, were positioned immediately adjacent one another in the common body. As best shown in FIG. 1A, controlled movement of actuator rod 24 acted through an arm 42 to selectively rotate an airfoil member 43 about its axis x—x.

This first embodiment offered three distinct modes of operation for each operable half of the dual-tandem actuator. However, such dual tandem servoactuators are generally large, heavy and complex. This was acceptable for some applications, but not for others.

Figure 2:
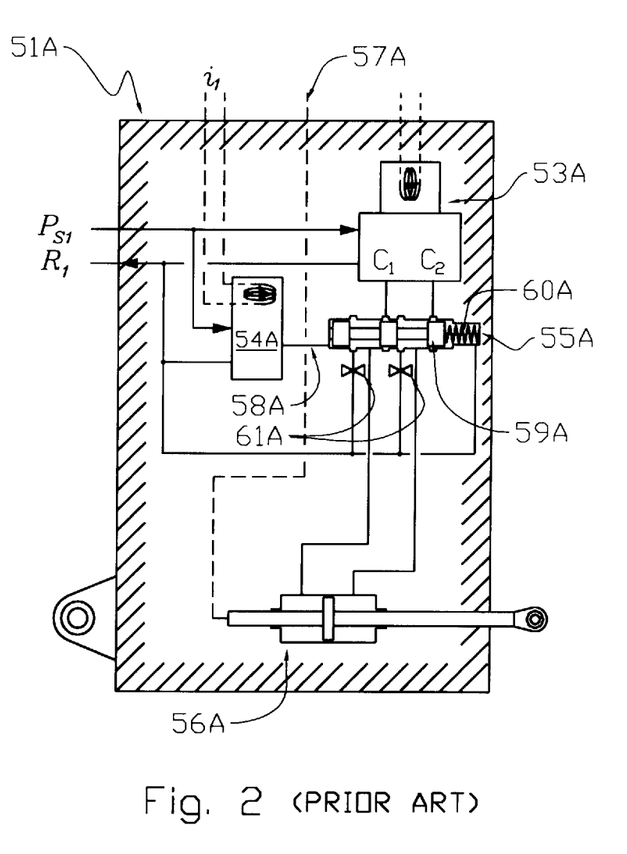
FIG. 2 is a schematic of a second prior art servoactuator.
Figure 2A:
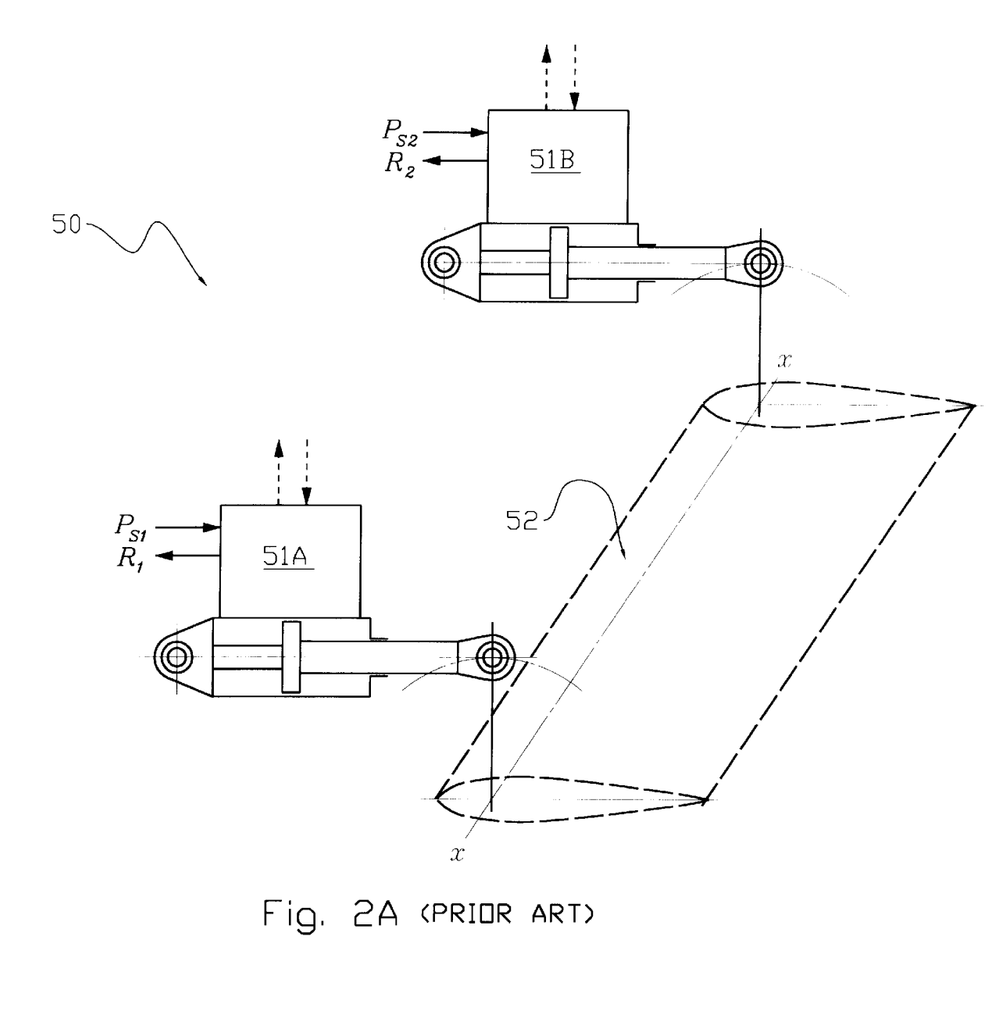
FIG. 2A is a schematic of a dual-redundant control actuation system in which two physically-separate single-system servoactuators of the type shown in FIG. 2 are coupled to a common load.

Second Prior Art Embodiment (FIGS. 2 and 2A)

FIG. 2A depicts another prior art redundant control actuation system, generally indicated at 50. This system included a left servoactuator 51A and a physically-separate identical right servoactuator 51B. Only the left servoactuator 51A illustrated in FIG. 2 will be described, it being understood that the same reference numeral, albeit with the suffix letter "B", will refer to the corresponding part, portion or surface of the right servoactuator 51B.

As shown in FIG. 2, servoactuator 51A includes a two-stage electrohydraulic servovalve 53A, again having an electrical section and a hydraulic section, as before. This servovalve may also be of the type shown and described in U.S. Pat. No. 3,023,782. Alternatively, other types of servovalves may be employed. Servovalve 53A is adapted to be supplied with pressurized fluid $P_{S1}$ from a suitable source, and is adapted to communicate with a fluid return $R_1$. Servoactuator 51A also includes a pilot solenoid valve 54A, a damped-bypass valve 55A, and an actuator 56A. An LVDT (not shown) was operatively arranged to provide an electrical feedback signal reflective of the position of the actuator rod via line 57A. Solenoid valve 54A is a three-way two-position solenoid-operated valve adapted to be energized by a current $i_1$. When solenoid valve 54A is de-energized, conduit 58A communicates with the fluid return $R_1$. When solenoid valve 54A is energized, supply pressure $P_{S1}$ is provided to conduit 58A. Bypass valve 55A is shown as having a three-lobed valve spool 59A mounted for sealed sliding movement within a body. A spring 60A urges the spool 59A to move leftwardly to the position shown.

To avoid interchanging logic information between the two separated servoactuators, the system shown in FIG. 2A was operated in an active-standby manner. In other words, during normal operation, one servoactuator was energized and pressurized, while the other was not. Hence, for example, if servoactuator 51A was pressurized and energized, the supply pressure $P_{S1}$ would be applied through conduit 58A to shift bypass valve spool 59A rightwardly, while compressing spring 60A. This enabled fluid communication between servovalve control ports $C_1$, $C_2$ with the opposing chambers of actuator 56A. If servoactuator 51A was used to control the movement of the load, servoactuator 51B was normally de-energized, and the condition of its various parts was as shown in FIG. 2. In other words, spring 60B expanded to urge bypass valve spool 59B rightwardly. Hence, fluid could flow with respect to other opposed chamber of actuator 56B via restricted orifices, severally indicated at 61B. Thus, by virtue of these restricted orifices, when one system was operated and the other was not, the non-operable servoactuator provided additional dynamic load that had to be overcome for the active servoactuator to displace the load 52. Hence, the servoactuators were built oversized to accommodate this additional load, and this unnecessary size compromised weight and expense.

If servoactuator 51A failed by becoming depressurized or de-energized, servoactuator 51B would be immediately energized. The failure of servovalve 51A would cause spring 60A to expand to move bypass valve spool 59A to the position shown in FIG. 2, while servoactuator 51B was simultaneously energized. Thus, the situation would be reversed with respect to that previously described, with servoactuator 51B thereafter controlling movement of the load, and servoactuator 51A being switched to a fail-safe or damped-bypass mode.

Alternatively, if both servoactuators failed by being either depressurized or de-energized, both bypass valve spools would move to the position shown in FIG. 2. Hence, restricted orifices 61A and 61B would provide impedance to prevent dynamic instability of the load, not with standing the fact that neither servoactuator thereafter affirmatively controlled the load.

Thus, each half of the prior art embodiment shown in FIGS. 1 and 1A was adapted to operate in active, free-bypass and fail-safe modes. These three modes were available when their use was appropriate because hydraulic logic was exchanged between the two sections of the servoactuator via lines 40A, 40B. This hydraulic logic exchange was enabled by the fact that the dual-redundant actuation elements of the system were positioned immediately adjacent one another in a common body.

However, FIG. 2 represented the next step in the evolution of such control systems. The redundant actuation elements were moved physically apart to form two separate servoactuators, with each servoactuator having its own body. Because of the physical separation of the servoactuators, and the use of separate actuator rods rather than a common tandem piston, the exchange of hydraulic logic information between the two servoactuators was abandoned. In the embodiment shown in FIG. 2, each servoactuator was adapted to be operated in only two modes: active, and fail-safe or damped-bypass.

Figure 3:
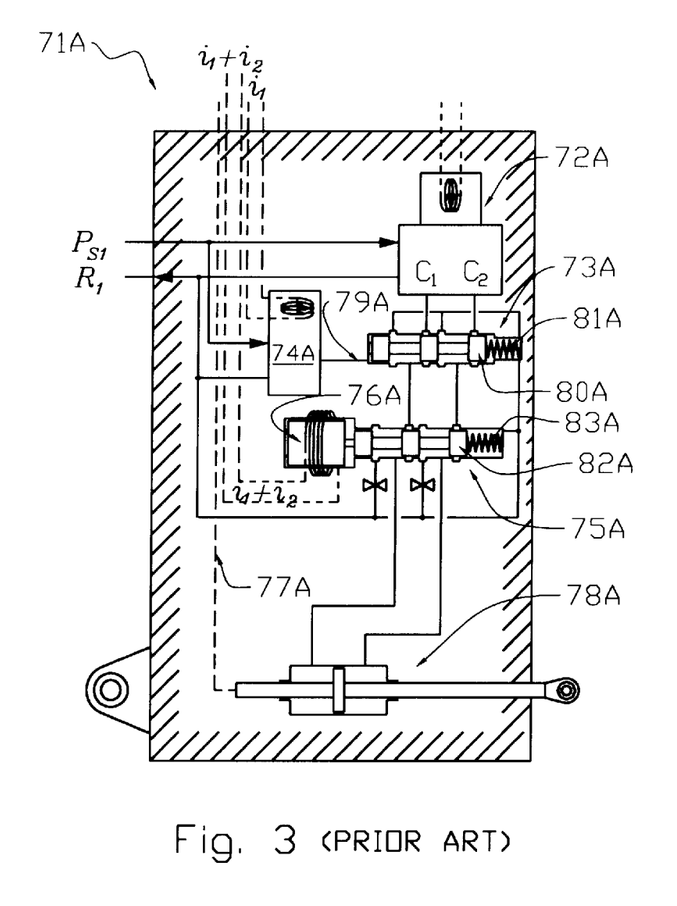
FIG. 3 is a schematic of a third prior art servoactuator.
Figure 3A:
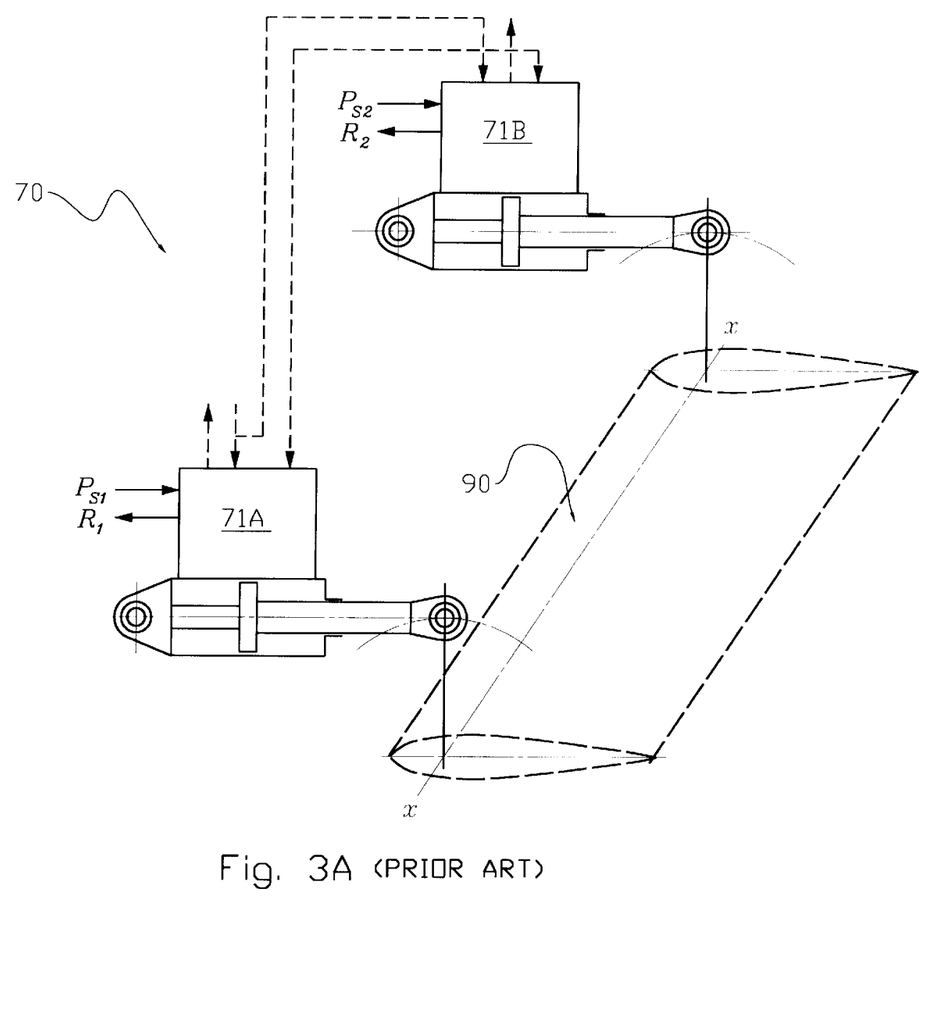
FIG. 3A is a schematic of a dual-redundant control system in which two physically-separate single-system servoactuators of the type shown in FIG. 3 are coupled to a common load and are electrically cross-coupled.

Third Prior Art Embodiment (FIGS. 3 and 3A)

FIG. 3A illustrates a third prior art dual-redundant control actuation system, generally indicated at 70, that also avoided the interchange of hydraulic logic information between physically-separate servoactuators 71A, 71B connected to a common load 90. Only the left servoactuator 71A illustrated in FIG. 3 will be explicitly described, it being understood that the corresponding parts, portions or services of the right embodiment are indicated by the same reference numeral, albeit with suffix letter "B".

Servoactuator 71A broadly included electrohydraulic servovalve 72A, a bypass valve 73A, a two-position solenoid-operated valve 74A, and a fail-safe valve 75A controlled by the operation of a solenoid 76A. Solenoid valve 74A was adapted to be energized with a current $i_1$. Similarly, solenoid valve 74B was adapted to be energized with a current $i_2$.

Solenoid 76A was adapted to be energized with two separate summed currents, $i_1+i_2$, where $i_2$ was derived from the control circuitry for servoactuator 71B and solenoid 76B was also adapted to be energized with two separate summed currents, $i_1+i_2$, where $i_1$ was derived from the control circuitry for servoactuator 71A. Thus, driving the solenoids 76A, 76B with summed currents, as described provided an electrical cross-coupling between servoactuators 71A, 71B. The two actuators 78A, 78B are connected to a common load 79. An LVDT (not shown) was operatively arranged to provide a feedback signal in lines 77A.

Here again, electrohydraulic servovalve 72A was a two-stage four-way servovalve, such as shown in U.S. Pat. No. 3,023,782, and was adapted to be supplied with a supply pressure $P_{S1}$, to communicate with a fluid return $R_1$, and to selectively produce a differential hydraulic output at its control ports $C_1$, $C_2$. Servovalve 72B was similarly adapted to be supplied with a supply pressure $P_{S2}$, to communicate with a fluid return $R_2$, and to selectively produce a differential hydraulic output at its control ports $C_1$, $C_2$, respectively.

When solenoid valve 74A was energized, supply pressure $P_{S1}$ existed in conduit 79A. Conversely, when solenoid valve 74A was de-energized, conduit 79A communicated with return $R_1$. Solenoid valve 74B operated in an analogous manner with respect to conduit 79B.

Bypass valve 73A is shown as having a three-lobed valve spool 80A mounted for sealed sliding movement within a body. The valve spool is biased to move leftwardly relative to the body by a spring 81A. Conduit 79A communicates solenoid valve 74A with the spool left end chamber.

The fail-safe valve 75A is also shown as including a three-lobed valve spool 82A mounted for sealed sliding movement within a body. A spring 83A biases spool 82A to move leftwardly toward the position shown. When solenoid 76A is energized, spool 82A will be displaced rightwardly, overcoming the compression of spring 83A.

This redundant control system was adapted to be operated primarily in an active-active manner. Normally, both servoactuators would be energized (i.e., $i_1$ and $i_2$ were provided) and pressurized (i.e., $P_{S1}$ and $P_{S2}$ were provided). Hence, each of the respective logic valve spools would be shifted in the appropriate direction against the urging of its associated return spring. Hence, each servovalve would communicate directly with its associated actuator.

Should there be a pressurization failure (i.e., $P_{S1}=0$) of servoactuator 71A, spring 81A would expand to move the bypass valve spool 80A to the position shown in FIG. 3. However, since both servoactuators would still be energized (i.e., $i_1$ and $i_2$ would still be provided), the two summed energization currents, $i_1+i_2$, would continue to hold valve spool 82A in a rightwardly-displaced condition. Thus, in this arrangement, when servoactuator 71A was depressurized but not de-energized, the opposing chambers of actuator 78A could communicate with the return. In effect, a depressurization of servoactuator 71A would cause the actuator 78A to switch to a fee-bypass mode, while servovalve B would continue in an active mode to control movement of the load.

Alternatively, if there was a de-energization of servovalve A, but not a depressurization, then $i_1$ would be lost. This would cause solenoid valve 74A to move to its de-energized position. Spring 81A would expand to shift valve spool 80A leftwardly to the position shown. However, even though there was an absence of current $i_1$, current $i_2$ from still-energized servoactuator 71B would be sufficient to hold fail-safe valve spool 82A in a rightwardly-displaced condition. Hence, in this condition, servoactuator A would be in a free-bypass mode.

Alternatively, if both servoactuators failed, either electrically or hydraulically, currents $i_1$ and $i_2$ would be removed from solenoids 76A and 76B, permitting the fail-safe springs 83A, 83B to expand to urge the fail-safe valves 82A, 82B, respectively, to move to the positions shown in FIG. 3. In this condition, both actuators would be switched to their fail-safe or damped-bypass modes such that flow with respect to the actuator chamber would be constrained to pass through restricted orifices 84A, 84B.

Thus, in the system shown in FIG. 3A, because of the electrical cross-coupling therebetween, each of the two servoactuators was normally adapted to operate in active, free-bypass and fail-safe (i.e., damped-bypass) modes, depending on the nature of the energization and pressurization failure(s). As with the form shown in FIG. 2A, the two servoactuators were physically separate from one another, and there was no attempt to exchange hydraulic logic information therebetween. The Improved Control System (FIGS. 4–4A)

The improved redundant control actuation system according to the present invention is generally indicated at 100 in FIG. 4A. This arrangement also includes two identical separate servoactuators, the left being indicated as servoactuator 101A and the right being indicated as servoactuator 101B. Here again, inasmuch as these two servoactuators are substantially identical, the suffixes "A" and "B" will be used to distinguish the corresponding parts, portions or surfaces of the two systems.

As best shown in FIG. 4, servoactuator 101A is shown as including an electrohydraulic servovalve 102A provided with a supply pressure $P_{S1}$, communicating with a return $R_1$ and adapted to provide differential hydraulic output at its outlet ports $C_1$, $C_2$, respectively. Servoactuator 101A also includes a solenoid-operated valve 103A, a bypass valve 104A, a fail-safe valve 105A and an actuator 106A. The two actuators are coupled to a common load 108 (FIG. 4A). A conduit 109A communicates the outlet of solenoid valve 103A with the spool left end chamber of bypass valve 104A and the spool left end chamber of fail-safe valve 105. When solenoid valve 103A is energized by current $i_1$, supply pressure will exist in conduit 109A and will shift the bypass valve spool 110A rightwardly, overcoming the bias of spring 111A, and will shift the fail-safe valve spool 112A rightwardly, overcoming the bias of spring 113A. Conversely, when solenoid valve 103A is de-energized, conduit 109A communicates with return $R_1$. In this condition, spring 111A expands to move bypass valve spool 110A leftwardly to the position shown.

The fail-safe valve 105A is shown as having a three-lobed valve spool 112A mounted for sealed sliding movement within a body. A spring 113A urges valve spool 112A to move leftwardly toward the position shown. An actuator 114A has a piston 115A arranged to act against the left end of fail-safe valve spool 112A. The left end chamber of actuator 114A is provided with the pressure in conduit 109B via conduit 116. Conversely, the pressure in conduit 109A is provided by a conduit 118 to the left end chamber of actuator 114B. The right chamber of actuator 114A, and the right chamber of actuator 114B are vented to the atmosphere.

Thus, when servoactuator 101A is both pressurized and energized, supply pressure $P_{S1}$ will exist in conduits 109A and 118, and will shift the bypass valve spool 110A rightwardly, overcoming the bias of spring 111A, and the fail-safe valve spool 112A rightwardly, overcoming the bias of spring 113A. Conversely, the pressure in conduit 109B will be transmitted by conduit 116 to the left end chamber of actuator 114A, also displacing the fail-safe valve spool rightwardly. Conversely, the pressure in conduit 109A will be transmitted via conduit 118 to the left end chamber of actuator 114B to shift fail-safe valve spool 112B rightwardly from the position shown. Thus, when both servoactuators are energized and pressurized, the bypass valve spools and fail-safe valve spools are shifted from the positions shown in FIG. 4 to their displaced positions, thereby allowing control of each actuator by its associated servovalve.

Should solenoid 103A be de-energized while servoactuator 101B remains pressurized and energized, conduit 109A will communicate with the return. Hence, bypass valve spool 110A will shift leftwardly to the position shown. This will isolate servovalve 102A from actuator 106A, and the opposed chambers of actuator 106A will communicate with the return. However, it should be noted that the pressurized signal from conduit 109B is transmitted via conduit 116 to keep fail-safe valve spool 112A shifted rightwardly. This allows actuator 106A to operate in its free-bypass mode.

Alternatively, should servoactuator 101A fail by being depressurized (but not de-energized), then the pressure in conduit 109A will again fall to the return pressure $R_1$. Spring 111A will expand to urge the bypass valve spool 110A to move leftwardly to the position shown in FIG. 4. However, the pressure of still-functioning servoactuator 101B will be transmitted via conduit 116 to the left end chamber of actuator 114A to hold fail-safe valve spool 112A in its rightwardly-displaced position. Thus, in this alternative situation, the opposing chambers of actuator 106A will communicate with the return.

Alternatively, if both servoactuators become either depressurized and/or de-energized, conduits 109A, 109B will communicate with their returns $R_1$, $R_2$, respectively. Hence, the bypass valve spool will be shifted back to the position shown in FIG. 4. Conversely, loss of supply pressure in conduits 109A and 109B, will be transmitted via conduits 116, 118, and the fail-safe valve spool springs 113A, 113B, will expand to move their respective valve spools to the position shown. In this condition, the opposed chambers of actuator 106A will communicate with return $R_1$ via restricted orifices 115A, 115A, while the opposed chambers of actuator 106B will communicate with return $R_2$ via restricted orifices 115B, 115B.

Therefore, in summary, with the invention shown in FIGS. 4 and 4A, the two servoactuators may be operated simultaneously to control movement of the load in an active-active manner. Alternatively, only one servoactuator need be pressurized and energized. The other will be in a free-bypass mode. Thus, if the improved system is operated initially in an active-active manner, and there is a pressurization or energization failure to either servoactuator, the affected servoactuator will be immediately shifted to a free-bypass mode, with the unaffected servoactuator continuing to maintain control over the load. Alternatively, if both servoactuators lose pressurization or energization, then both servoactuators move to a fail-safe or damped-bypass mode in which free movement of the load is restrained by passage of fluid through the restricted orifices.

Thus, as demonstrated above, the prior art purposefully avoided, and therefore taught away from, the exchange of hydraulic logic information between two physically-separate servoactuators. The inventive improvement, however, defied this trend by purposefully providing for the exchange of hydraulic logic signals between the servoactuators.

MODIFICATIONS

The present invention contemplates that many changes and modifications may be made. For example, the servovalves may be two-stage four-way electrohydraulic servovalves, such as shown and described in U.S. Pat. No. 3,023,782. Alternatively, other types of servovalves may be substituted therefor. In the aircraft environment, it is generally desired that pressure sources $P_{S1}$ and $PS_{S2}$ be independent of one another. However, while desirable, this is not critical to the operation of the invention. Fluid sources $P_{S1}$ and $P_{S2}$ may therefore be independent of one another, or provided from a common source. Similarly, returns $R_1$ and $R_2$ may connect with a common return, or may be wholly independent of one another. The bypass and fail-safe valves may be rearranged in position between the control valve and the actuator and yet provide the same functions. The bypass valve and fail-safe valve may be spool valves, as shown, or may be of some other type or configuration. Similarly, the solenoid valves may be pilot-type poppet or spool valves. They may be integrated with the bypass valves, or the bypass function may be integrated with the control valve. The manner in which the redundancy of the improved actuation system is managed may be active-active or active-standby. The fail-safe mode may be damped-bypass or may be arranged to cause the servoactuator to drive to a preferred position.

Therefore, while the presently-preferred form of the inventive redundant control system has been shown and described, and several modifications thereof discussed, persons skilled in this art will readily appreciate that various additional changes and modifications may be made without departing from the spirit of the invention, as defined and differentiated by the following claims.

What is claimed is:

1. A servoactuator for use in a redundant control actuation system, said servoactuator having a body, said servoactuator comprising:

a control valve mounted on said body and arranged to provide a hydraulic output in response to a control signal;

a hydraulic actuator mounted on said body and arranged to move a load in response to the hydraulic output from said control valve; and logic valve means mounted on said body and operatively associated with said control valve and actuator, said body communicating with a source of pressurized fluid and with a fluid return, said body being provided with an external hydraulic signal, said logic valve means being supplied with hydraulic and electrical signals and being operatively arranged between said control valve and said actuator to either (a) permit control operation of said actuator in response to said control signal, (b) permit said actuator to move freely and independently of said control signal, or (c) restrain movement of said load independently of said control signal, as a function of said supplied hydraulic and electrical signals, said logic valve means being arranged to provide a hydraulic output signal external of said body which is a function of said hydraulic and electrical signals.

2. A servoactuator as set forth in claim 1 wherein said control valve is an electrohydraulic servovalve.

3. A servoactuator as set forth in claim 1 and further comprising: a first flow passageway arranged to selectively communicate the opposing chambers of said actuator when said logic valve means permits said actuator to move freely and independently of said control signal.

4. A servoactuator as set forth in claim 3 and further comprising: a second flow passageway having a restrictive orifice, said second flow passageway being arranged to selectively communicate the opposing chambers of said actuator when said logic valve means causes said actuator to restrain movement of said load independently of said control signal.

5. A servoactuator as set forth in claim 1 wherein said logic valve means includes a bypass valve and a fail-safe valve connected hydraulically between said control valve and said actuator.

6. A servoactuator as set forth in claim 5 wherein said bypass valve is movable between a first position in which fluid is permitted to flow between said control valve and actuator, and a second position in which fluid is prevented from flowing between said control valve and actuator but is freely bypassed between the opposing chambers of said actuator, and wherein said bypass valve is biased toward said second position.

7. A servoactuator as set forth in claim 6 wherein said bypass valve includes a valve spool mounted for sealed sliding movement within a body, and wherein a spring is operatively arranged to cause said bypass valve spool to move toward said second position, and wherein a fluid pressure is operatively arranged to cause said bypass valve spool to move toward said first position.

8. A servoactuator as set forth in claim 7 and further comprising: a source of pressurized fluid and a solenoid valve operatively arranged between said source and said bypass valve, said solenoid valve communicating with said source and being arranged such that energization of said solenoid valve by said electrical input signal will cause pressurized fluid from said source to move said bypass valve spool to said first position and to provide said hydraulic output signal.

9. A servoactuator as set forth in claim 5 wherein said fail-safe valve is movable between an open position in which fluid is permitted to flow between said bypass valve and said actuator, and a closed position in which fluid is prevented from flowing between said bypass valve and said actuator, and wherein said fail-safe valve is biased toward said closed position.

10. A servoactuator as set forth in claim 9 wherein said fail-safe valve includes a valve spool mounted for sealed sliding movement within a body, and a spring operatively arranged to cause said fail-safe valve spool to move toward said closed position, and wherein a fluid pressure is supplied to said servoactuator as said hydraulic input signal and is operatively arranged to cause said fail-safe valve spool to move toward said open position.

11. A redundant control actuation system, comprising:
first and second servoactuators, each servoactuator having a body and having:
a control valve mounted on the associated body and arranged to provide a hydraulic output in response to a control signal;
a hydraulic actuator mounted on said associated body and arranged to move a load in response to the hydraulic output from said control valve; and
logic valve means mounted on said associated body and operatively associated with said control valve and actuator, said associated body communicating with a source of pressurized fluid and with a fluid return, said associated body being provided with an external hydraulic signal, said logic valve means being supplied with such hydraulic and electrical signals and being operatively arranged between said control valve and said actuator to either (a) permit control operation of said actuator in response to said control signal, (b) permit said actuator to move freely and independently of said control signal, or (c) restrain movement of said load independently of said control signal, as a function of said supplied hydraulic and electrical signals, said logic valve means being arranged to provide a hydraulic output signal external of said associated body which is a function of said hydraulic and electrical signals;
and wherein the hydraulic output signal of each servoactuator is provided as the hydraulic input signal to the other servoactuator.

12. A redundant control actuation system as set forth in claim 11 wherein each control valve is an electrohydraulic servovalve.

13. A redundant control actuation system as set forth in claim 12 wherein said control valves are identical to one another.

14. A redundant control actuation system as set forth in claim 11 wherein each servoactuator further comprises: a first flow passageway arranged to selectively communicate the opposing chambers of the associated actuator when the associated logic valve means permits said associated actuator to move freely and independently of said control signal.

15. A redundant control actuation system as set forth in claim 14 wherein each servoactuator further comprises: a second flow passageway having a restrictive orifice, said second flow passageway being arranged to selectively communicate the opposing chambers of the associated actuator when said logic valve means causes said associated actuator to restrain movement of said load independently of said control signal.

16. A redundant control actuation system as set forth in claim 15 wherein each fail-safe valve is movable between an open position in which fluid is permitted to flow between the associated bypass valve and the associated actuator, and a closed position in which fluid is prevented from flowing between the associated bypass valve and the associated actuator, and wherein each fail-safe valve is biased toward said closed position.

17. A redundant control actuation system as set forth in claim 16 wherein each fail-safe valve includes a valve spool mounted for sealed sliding movement within a body, and a spring operatively arranged to cause said fail-safe valve spool to move toward said closed position, and wherein a fluid pressure is supplied to said servoactuator as said hydraulic input signal and is operatively arranged to cause said fail-safe valve spool to move toward said open position.

18. A redundant control actuation system as set forth in claim 11 wherein said each logic valve means includes a bypass valve and a fail-safe valve connected hydraulically between the associated control valve and the associated actuator.

19. A redundant control actuation system as set forth in claim 18 wherein each bypass valve is movable between a first position in which fluid is permitted to flow between the associated control valve and the associated actuator, and a second position in which fluid is pre-vented from flowing between said associated control valve and said associated actuator but is freely bypassed between the opposing chambers of said actuator, and wherein each bypass valve is biased toward said second position.

20. A redundant control actuation system as set forth in claim 19 wherein each bypass valve includes a valve spool mounted for sealed sliding movement within a body, and wherein a spring is operatively arranged to cause said bypass valve spool to move toward said second position, and wherein a fluid pressure is operatively arranged to cause said bypass valve spool to move toward said first position.

21. A redundant control actuation system as set forth in claim 20, wherein each servoactuator further comprises a source of pressurized fluid and a solenoid valve operatively arranged between said source and the associated bypass valve, each solenoid valve communicating with said source and being arranged such that energization of said solenoid by said supplied electrical input signal will cause pressurized fluid from said source to move the associated bypass valve to said first position and to provide said hydraulic output signal.

* * * * *